United States Patent [19]

Hanratty

[11] 4,006,305
[45] Feb. 1, 1977

[54] BLINKER PRACTICE LIGHT

[76] Inventor: Emmett A. Hanratty, 966 W. 9th St., No. F., San Pedro, Calif. 90731

[22] Filed: Oct. 16, 1975

[21] Appl. No.: 623,270

[52] U.S. Cl. .............................. 178/115; 35/8 A; 35/14; 340/331
[51] Int. Cl.² .................. G09B 19/26; H04L 15/03
[58] Field of Search ............... 178/115; 35/8 A, 14; 84/464; 340/366 B, 331, 407

[56] References Cited

UNITED STATES PATENTS

| 1,690,279 | 11/1928 | Craft | 84/464 |
| 2,492,160 | 12/1949 | Lekas | 178/115 |
| 3,598,889 | 8/1971 | Switsen | 84/464 |

Primary Examiner—Thomas B. Habecker
Attorney, Agent, or Firm—Fulwider, Patton, Rieber, Lee & Utecht

[57] ABSTRACT

A code practice blinker light is to be used in conjunction with a tape or record player sending code. The output signal of the tape or record player drives the input base circuit of a transistor, the switching action thereof causing the closing of a series circuit including a lamp which flashes on and off in response to the input audio signal.

1 Claim, 1 Drawing Figure

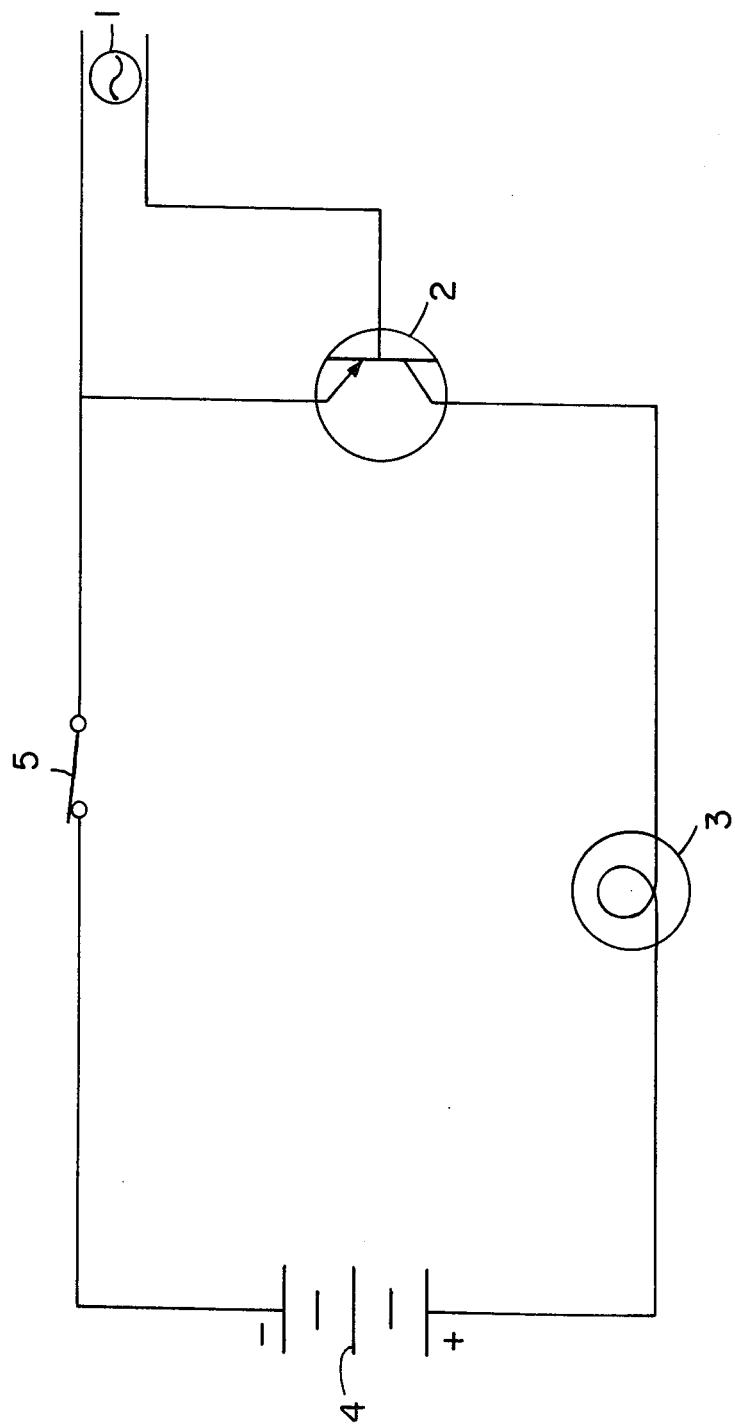

BLINKER PRACTICE LIGHT

BACKGROUND OF THE INVENTION

1. Field of the Invention

The present invention relates to code practice apparatus and, more particularly, to such an apparatus incorporating a flashing light.

2. Description of the Prior Art

Prior art systems for code practice have included visual as well as audible signals. However, those employing visual signals have typically been unusually complex in their design. There has, therefore, been a need for a relatively simple code practice apparatus which generates visual signals in response to conventionally generated coded signals.

SUMMARY OF THE INVENTION

The present invention provides a visual code practice apparatus which utilizes as its input a source of code signals such as the normal audio signal from a tape or record player. Thereafter, the conversion from audible to visual code signals is accomplished by connecting the audio signal at a conventional audio output jack directly as an input to the code practice blinker light of the present invention. The input signal is coupled to a solid state switch means connected in series circuit with a light means and battery means.

BRIEF DESCRIPTION OF THE DRAWING

The Figure of the drawing is an electrical schematic diagram of the blinker practice light of the invention.

DESCRIPTION OF THE PREFERRED EMBODIMENT

Turning now to the drawing, the blinker practice light of the present invention includes a transistor 2 having its collector-to-emitter circuit connected in series with two 1.5 volt batteries 4 and a lamp 3. A switch 5 is provided for opening the series circuit. The input signal on line 1 to the transistor circuit is derived from the audio output of a record or tape recorder and is connected to the base-emitter circuit of the transistor. The characteristics of the transistor as as follows:

A silicon NPN transistor having a typical $h_{FE}$ of 25 utilizing a typical $V_{CE}$ of 30 volts and an $I_C$ of 3 amperes and dissipating 15 watts.

The bulb utilized with the circuit of the invention is preferably a 2 volt bulb drawing 0.06 amperes.

While a presently preferred embodiment of the invention has been described, it will be appreciated that modifications in the circuit are possible, and the scope of the invention is not to be limited, except by the following claim.

I claim:

1. A code practice blinker light consisting only of coupling means adapted to be coupled to a source of code signals, solid state switch means, said switch means being connected to said coupling means, light means, battery means, said switch means, said light means and said battery means being in series circuit, whereby code signals applied to said coupling means cause said light to go on and off.

* * * * *